United States Patent
Smeulders

(12) 
(10) Patent No.: US 6,922,531 B2
(45) Date of Patent: Jul. 26, 2005

(54) METHOD AND SYSTEM FOR ENCODING OPTICAL COMMUNICATION INFORMATION DURING AUTOMATIC LASER SHUTDOWN RESTART SEQUENCE

(75) Inventor: Paul A. Smeulders, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 663 days.

(21) Appl. No.: 10/102,790

(22) Filed: Mar. 21, 2002

(65) Prior Publication Data

US 2004/0208641 A1 Oct. 21, 2004

(51) Int. Cl.[7] .......................... H04B 10/08; H04B 10/00
(52) U.S. Cl. .............................. 398/25; 398/9; 398/15; 398/17; 398/31; 398/141; 398/182; 356/73.1; 250/551
(58) Field of Search ................................ 398/9–10, 13, 398/15–17, 20, 24–25, 31–33, 38, 139, 141, 186, 196, 197, 200, 202, 210, 213–214; 356/73.1; 250/551

(56) References Cited

U.S. PATENT DOCUMENTS

| | | | | |
|---|---|---|---|---|
| 4,994,675 A | * | 2/1991 | Levin et al. ................. 250/551 |
| 5,099,349 A | * | 3/1992 | Yoshida et al. ............... 398/20 |
| 5,428,471 A | * | 6/1995 | McDermott ................. 398/181 |
| 5,513,029 A | | 4/1996 | Roberts ....................... 359/177 |
| 6,043,915 A | * | 3/2000 | Giles et al. ................... 398/94 |
| 6,839,516 B2 | * | 1/2005 | Lee et al. ..................... 398/15 |
| 2004/0264518 A1 | * | 12/2004 | Chang ................... 372/29.021 |
| 2005/0031352 A1 | * | 2/2005 | Light et al. ................. 398/135 |

OTHER PUBLICATIONS

International Telecommunication Union, ITU–T Recommendation G.664, *Optical Safety Procedures and Requirements for Optical Transport Systems*, Jun. 1999.

* cited by examiner

*Primary Examiner*—Kinfe-Michael Negash
(74) *Attorney, Agent, or Firm*—Christopher & Weisberg, P.A.

(57) ABSTRACT

A system and method for identifying one or more characteristics of an optical signal, in which a transmitter is operable to transmit an optical signal and a receiving unit is operable to receive the optical signal. The transmitter has a laser for generating the optical signal and an encoding unit adapted to control the laser to activate and deactivate the optical signal during a laser shutdown state based on a predetermined code. The receiving unit has an optical receiver optically coupled to the transmitter by a light transmission medium and is operable to receive the optical signal from the transmitter. The receiving unit also has a decoder measuring at least one of an active time of the optical signal and the inactive time between active times of the optical signal. The decoder determines at least one of the one or more characteristics of the optical system based on at least one of the active time or the inactive time.

32 Claims, 2 Drawing Sheets

| ALS Off Duration | Source ID | Wavelength | Power |
|---|---|---|---|
| 100 | 1 | $\lambda_1$ | $p_1$ |
| 101 | 1 | $\lambda_2$ | $p_2$ |
| 102 | 2 | $\lambda_1$ | $p_1$ |
| 103 | 3 | $\lambda_1$ | $p_1$ |
| 104 | 3 | $\lambda_2$ | $p_3$ |
| 105 | 4 | $\lambda_1$ | $p_2$ |

METHOD AND SYSTEM FOR ENCODING OPTICAL COMMUNICATION INFORMATION DURING AUTOMATIC LASER SHUTDOWN RESTART SEQUENCE

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to optical communication networks, and in particular, to systems and methods for optical communication networks which require individual wavelength and source identification while the transmission source is in an automatic laser shutdown state.

BACKGROUND OF THE INVENTION

As the desire for bandwidth increases, the technologies supporting the additional bandwidth must too expand. With this expansion comes additional network complexities as multiple sources and destinations are installed at the same physical locations.

The addition of sources and destinations at a single physical location also increases the possibility of injury to technicians installing and terminating fiber optic lines. This is the case because technicians must often use equipment which requires looking into the end of a fiber optic cable. An inadvertent light signal, particularly when magnified, can cause eye injury to the technician if the technician is looking into the fiber optic cable end. In this regard, standards bodies such as the International Telecommunications Union ("ITU") have promulgated standards such as the ITU-G.664 Automatic Laser Shutdown ("ALS") standard. In accordance with this standard, a transmitting laser is shutdown when the receiver in the node does not receive a signal from the remote end.

Optical transmission systems typically carry information bit streams as 100% amplitude modulated, also known as on-off keying, signals using an optical carrier signal. As with other carriers in the electromagnetic spectrum, an optical carrier can be modulated many different ways. However, extraction of the information content requires demodulation of the bit stream.

For a fiber optic cable carrying a single optical carrier, a tap may be inserted at any point in the fiber to redirect a portion of the optical carrier power, and the bit stream may be demodulated by a receiver coupled to the tap. This is rarely done for a single carrier fiber. Also, the tap is normally used only to measure DC optical power or a receiver is placed at the extreme end points where no tap is used. In the latter case, the entire optical carrier is terminated at the intended receiver. Dense wave division multiplexing ("DWDM") systems carry a number of orthogonal optical carriers in a common fiber optic cable. To receive the various bit streams, the carriers must be demultiplexed using wavelength selective filters. The resulting single carrier signals are presented to receivers where the bit stream is demodulated. Once again, optical taps may be present in the fiber optic cable, and often measure the total optical power present in the fiber. This can be done using wide band taps as are known in the art in which there is no frequency selectivity within the band of interest.

A drawback of the wide band tap is that the power of individual wavelengths in the fiber optic cable can not be discerned. Only the aggregate total power can be determined. If there is no modulation scheme other than the original on-off keying ("OOK"), there is no way to determine the individual wavelength power other than by using expensive demultiplexing filters and individual power measuring receivers. Also, the quantity of wavelengths present, and their original source are not discernable using a wide band tap. However, these attributes are useful in systems concerned with fiber interconnect topology path knowledge, mis-fibering, i.e. miswiring detection schemes and troubleshooting strategies.

It is therefore desirable to be able to determine individual carrier power, individual carrier frequency (or wavelength), and the individual carrier identity present in a multi-carrier fiber optic cable. The identity may be any unique tag which, for example identifies the actual source of a signal.

Systems for determining individual carrier power, individual carrier wavelength, and the source identity are known. For example, sub-carrier modulation schemes such as amplitude modulation ("AM") schemes have been used.

In a DWDM system using AM technology, each source applies a 100% AM (or OOK) for the bit stream and a low percentage modulation, very low switching rate, signal on each wavelength. The signal is typically a simple sinusoidal tone which periodically switches to a new frequency, for example, every 1.5 seconds. Each optical carrier frequency is assigned a defined set of sub-carrier tones that may be applied to it, for example a set of 8 sub-carrier tones. These tone frequencies form unique sets for each optical carrier frequency. Only one frequency within the set is active at any one time.

Thus, a DWDM fiber optic cable may be observed with a wide band tap in which the receiver is heavily low pass filtered at a cut-off frequency just higher than the highest set of tones which may be present. The frequency domain spectrum of this resultant signal therefore yields a series of spectral lines (or bands), one for each of the active tones in the DWDM aggregate signal. The presence of a tone within a set indicates the presence of a particular wavelength in the fiber optic cable under observation.

The amplitude of the tone applied at the source is a fixed proportion of the actual launch power of the optical carrier. Therefore, the amplitude of the received tone at the monitor point is in direct proportion to the actual optical power received at that point excluding some non-linear effects which are not relevant for discussion or understanding of the present invention. The use of a one-in-a-set of preassigned tone frequencies enables another channel for data communication using a frequency shift keying ("FSK") approach in which the tone frequency is changed periodically thus representing a symbol time, wherein a tone encodes a multi-bit symbol. For example, in the case of an 8-set of tones, 3 bits of information can be conveyed each symbol time. Thus, an oct-ary FSK modulated bit stream is available. For example, in the case of a typical AM scheme, the tone changes every 1.5 seconds. One bit per symbol is used simply as a clock synchronization indicator, and thus the real effective bit rate is 1.333 bits per second. This FSK modulated stream typically encodes identification information about the actual source for that wavelength, for example, a globally unique serial number.

Under this arrangement, all three pieces of desirable information, wavelength identification, power, and source identification, are available using a wide band tap and receiver in which some simple processing is applied to extract bit streams encoded by each set of tones.

Unfortunately, the scheme described above requires that the optical carrier be continuously active for all attributes to be continuously monitored. However, when fiber optic cables are broken, or during the installation of fiber optic systems, carriers are typically not available in upstream fibers. More importantly, optical power is emitted from the open end of the fiber optic cable, thereby posing a hazard to the service personnel or anyone else who may look at the fiber end at close proximity as described above.

For this reason, the ITU has promulgated the G.664 Standard which executes upon the event of an optical channel being made discontinuous. When the channel is continuous, the optical power is wholly contained in the fiber optic cable and no danger is posed. Also, the G.664 Standard describes the consequent actions to be taken upon discovery of an open optical circuit.

A circuit is considered to be full duplex, consisting of a receiver and transmitter at each end of an optical link. When a fiber strand breaks, the receiver no longer measures an optical power signal at its input. The receiver immediately turns off its related transmitter. The fiber from that transmitter may be geographically distinctly routed compared to the fiber which was cut, and therefore may not also be cut. Nonetheless, as the receiver at the end of that possibly uncut fiber sees no incoming power, it likewise turns off its source. The result is that there is now no optical power being emitted from the dangerous end of the fiber cut. The same occurs if both fibers are cut. This arrangement is referred to as an automatic laser shutdown ("ALS") operation. Similarly, G.664 also describes an automatic power reduction procedure for amplifiers.

The receivers and the transmitters act automatically to turn off power. It is also desirable to have an automatic procedure to restart the link. The G.664 Standard describes such an ALS restart procedure.

When a source is in an ALS shutdown state, it may emit an optical carrier for 2 seconds±0.25 seconds followed by a fully off period of between 100 and 300 seconds. It is believed that such short pulses of light do not present substantial risk of injury. If a receiver actually observes these pulses, it correctly concludes that the circuit has been re-completed, and it may begin to drive its associated transmitter to carry traffic to its destination.

Although the AM-based identification procedure described above generally requires that an optical carrier be continuously present, because the AM-carrier information is imposed whenever the signal is active. It is possible to convey the frequency, amplitude and FSK modulated identifier/bit stream during ALS pulsing. However, because the bit stream is so low under continuous conditions and because the ALS restart procedure offers the opportunity to convey symbols every 100 to 300 seconds, the very slow conveyance of information is useless (approximately 3 data bits every 100 to 300 seconds). Further, the complexities of maintaining bit synchronization during the 100 to 300 second inactive time is impractical.

It is therefore desirable to be able to convey the source identifier information in an efficient and effective manner even while the ALS restart procedure is in effect.

In a given DWDM bundle, carriers are distinct in the frequency domain. Therefore, there is never a case where a wavelength in a fiber optic cable is not determinable by the frequency tag provided by the AM scheme. Given some high speed control channel such as a common channel which accompanies or is somehow associated with the optical payload such as via an optically-modulated optical-supervisory channel or a separate communications system, it is possible to carry "linked" information such as the source identifier by creating a logical association with the wavelength number. This scheme works perfectly well when there are no re-used frequencies as should be the case in a particular fiber optic cable.

However, in a large office such as may be implemented by a telecommunications carrier, a piece of equipment may serve several DWDM fibers. Each of these fibers may contain any or all of the carrier frequencies available. Thus, in a given office, there may be several distinct sources, each with the same carrier frequency assigned, but meant to serve different fiber optic cables. The possibility of connecting a signal unto the wrong fiber is quite high, and the erroneous case is not distinguishable by examining only the frequency domain match information. The FSK modulated bit stream must be demodulated and compared to the expected value.

Thus, during installation, when ALS will be active, such as is the case where G.664 safety procedures are mandated by the owner or installation personnel, it would take an undesirable amount of time to distinguish the identity of the optical signal source. It is therefore desirable to have a method and system which works in conjunction with ALS while still allowing optical power, the wavelength and source identifier to be easily determined.

SUMMARY OF THE INVENTION

The present invention advantageously provides a system and method for determining the optical received power and/or optical wavelength and/or source identifier in an ALS fiber optic communications environment.

In accordance with an aspect, the present invention provides a system for identifying one or more characteristics of an optical signal, in which the system has a transmitter and a receiving unit. The transmitter is operable to transmit an optical signal and includes a laser for generating the optical signal and an encoding unit. The encoding unit is adapted to control the laser to activate and deactivate the optical signal during a laser shutdown state based on a predetermined code. The receiving unit includes an optical receiver and a decoder. The receiver is optically coupled to the transmitter by a light transmission medium and is operable to receive the optical signal from the transmitter. The decoder measures at least one of an active time of the optical signal and an inactive time between active times of the optical signal. The decoder determines at least one of the one or more characteristics of the optical system based on at least one of the active time or the inactive time.

In accordance with another aspect, the present invention provides an optical signal transmitter for use in a system to identify one or more characteristics of the optical signal in which the transmitter has a laser for generating the optical signal and an encoding unit. The encoding unit is adapted to control the laser to activate and deactivate the optical signal during a laser shutdown state based on a predetermined code corresponding to one or more characteristics of a transmitted optical signal.

In accordance with still another aspect, the present invention provides a receiving unit for use in a system to identify one or more characteristics of an optical signal in which the receiving unit has an optical receiver and a decoder. The optical receiver is adapted to receive an optical signal from a light transmission medium. The decoder measures at least one of an active time of the received optical signal and an inactive time between active times of the received optical signal and determines at least one of the one or more characteristics of the optical system based on at least one of the active time or the inactive time.

In accordance with yet another aspect, the present invention provides a method for identifying one or more characteristics of an optical signal in which a predetermined code corresponding to at least one characteristic of the optical signal is read from a memory. A laser is controlled to activate and deactivate the optical signal during a laser shutdown state based on the predetermined code. The optical signal is received at a receiving unit. At least one of an active time of the optical signal and an inactive time between active times of the optical signal is measured. At least one of the one or more characteristics of the optical system is determined based on at least one of the active time or the inactive time.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
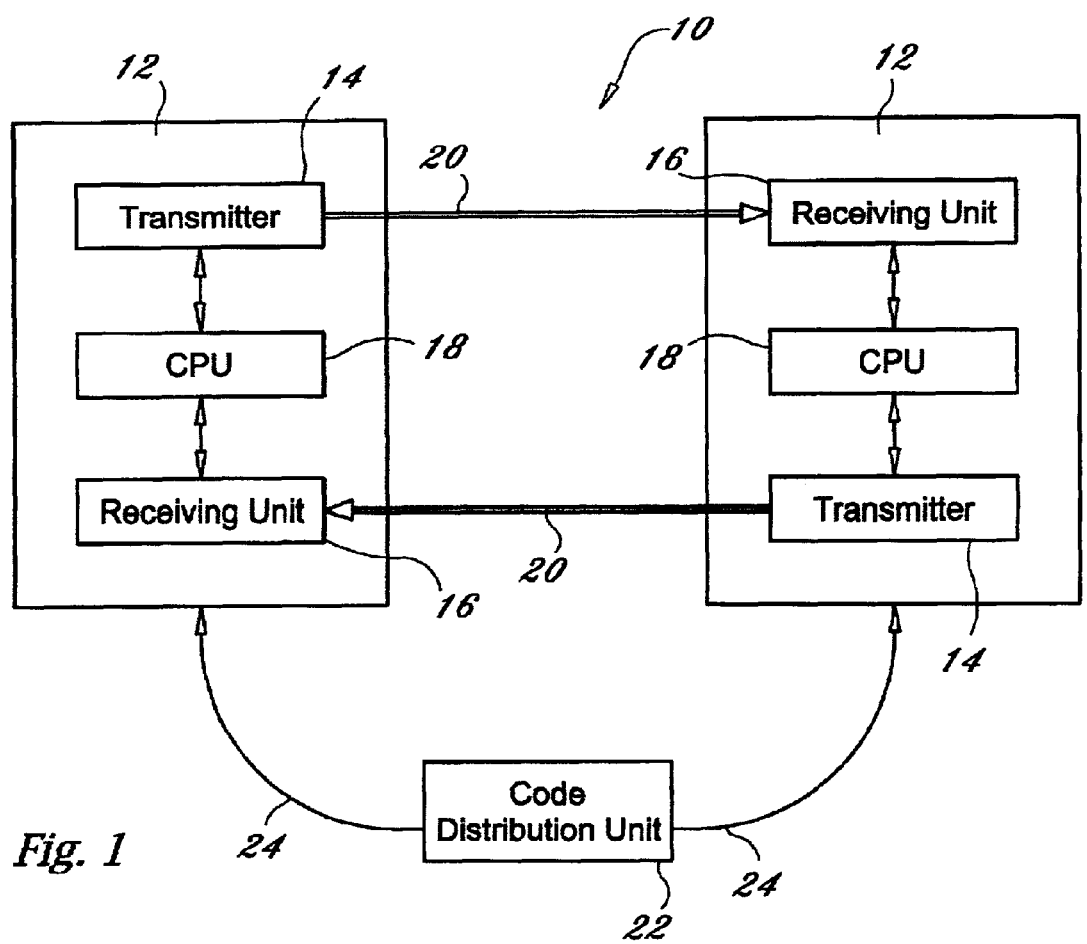
FIG. 1 is a block diagram of an optical transmission system constructed in accordance with the principles of the present invention.

Referring now to the drawing Figures in which like reference designators refer to like elements there is shown in FIG. 1 an optical transmission system constructed in accordance with the principles of the present invention and designated generally as 10. Optical transmission system 10 preferably includes one or more nodes 12. Each node includes an optical transmitter 14, a receiving unit 16, and central processing unit ("CPU") 18 in electrical communication with transmitter 14 and receiving unit 16. Although only a single transmitter 14, receiving unit 16, and CPU 18 are shown as part of each node 12, it is understood that each node 12 can include one or more of transmitter 14, receiving unit 16 and CPU 18.

Nodes 12 are optically coupled by one or more optical links 20. Optical links 20 are used to facilitate optical communication between nodes 12 and can be any optical communication medium such as a fiber optic cable. Although only two nodes 12 are shown in FIG. 1, it is understood that an optical network of nodes can be arranged and implemented depending upon the capacity and design requirements for system 10. Further, although nodes 12 shown in FIG. 1 are coupled together, it is contemplated that a complex network of nodes can be arranged in which not every node 12 is connected to every other node 12.

As is discussed below in detail, each optical transmitter 14 is arranged to generate an optical signal for transmission to another node 12 along optical link 20. Each receiving unit 16 is arranged to receive an optical signal from another node 12 via optical link 20. CPU 18 can be any central processing unit, microcontroller and the like which controls the below-described functions of nodes 12, including those performed by transmitter 14 and receiving unit 16.

Although not shown, it is also contemplated that the present invention can be implemented in a DWDM environment which includes intermediate detectors along the optical signal path. By coupling a receiver to the intermediate detector, the functions described below can be implemented at intermediate points along the optical signal path.

Also as shown in FIG. 1, system 10 includes code distribution unit ("CDU") 22 coupled to nodes 12 by a corresponding CDU link 24. CDU 22, as described below in detail, stores codes corresponding to ALS active laser times and/or inactive laser times which further correspond to one or more characteristics of optical system 10, including but not limited to a source identifier, wavelength identifier, transmit power level and/or a state identifier to indicate whether the ALS restart state is active or inactive. It is contemplated that the characteristic data can include one or more of other parameters as well and is not limited to the above-described embodiment.

CDU 22 can be any suitable computing unit such as a PC, mini computer, or mainframe computer adapted to store codes and corresponding characteristics and to distribute those codes to one or more nodes 12 through CDU link 24. It is contemplated that the distribution of the codes to nodes 12 can be periodic, update-based, or operator-initiated. Although not shown, CDU 22 is programmed remotely via a network connection or by a locally-connected operator interface. Nodes 12 are equipped with network interfaces suitable to receive data transmitted via a corresponding CDU link 24. It is contemplated that the network interface is controlled by CPU 18.

CDU links 24 can be any communication link suitable for distributing code data to nodes 12, such as a local area network ("LAN") connection, wide area network ("WAN") connection, serial line, frame relay connection, etc. Practically speaking, the characteristics of CDU links 24 will depend on the proximity of CDU 22 to the nodes 12 to which it is connected.

Although a single CDU 22 is shown coupled to both of nodes 12 shown in FIG. 1, it is contemplated that multiple CDU's 22 can be implemented such that each CDU 22 distributes codes to one or more nodes 12 or serves as a backup for one or more other CDU's 22. Further, it is contemplated that a separate network of interconnected CDU's 22 can be implemented such that codes are distributed to CDU's 22 from a master CDU 22.

The arrangement shown in FIG. 1 represents an embodiment in which the codes are distributed out-of-band, namely separate from the optical data transmitted between nodes 12 along optical links 20. It is contemplated, however, that the codes can be distributed in-band along with the optical data via optical links 20. However, because the present invention is designed to be able to transmit characteristic data during ALS periods, in-band code distribution is not as efficient as out-of-band code distribution within the context of the present invention because in-band code distribution provides that the codes can only be efficiently distributed via links 20 when the optical links 20 are operational and the nodes are engaged in normal communication with each other.

It is also contemplated that system 10 can be implemented without CDU 22 and without CDU links 24. In particular, it is contemplated that the codes and their corresponding characteristic data can be preconfigured into node 12 and stored in a non-volatile memory such as an electrically erasable programmable read only memory ("EEPROM"), flash memory, read only memory ("ROM"), non-volatile access random access memory ("NVRAM") and the like.

Figure 2:
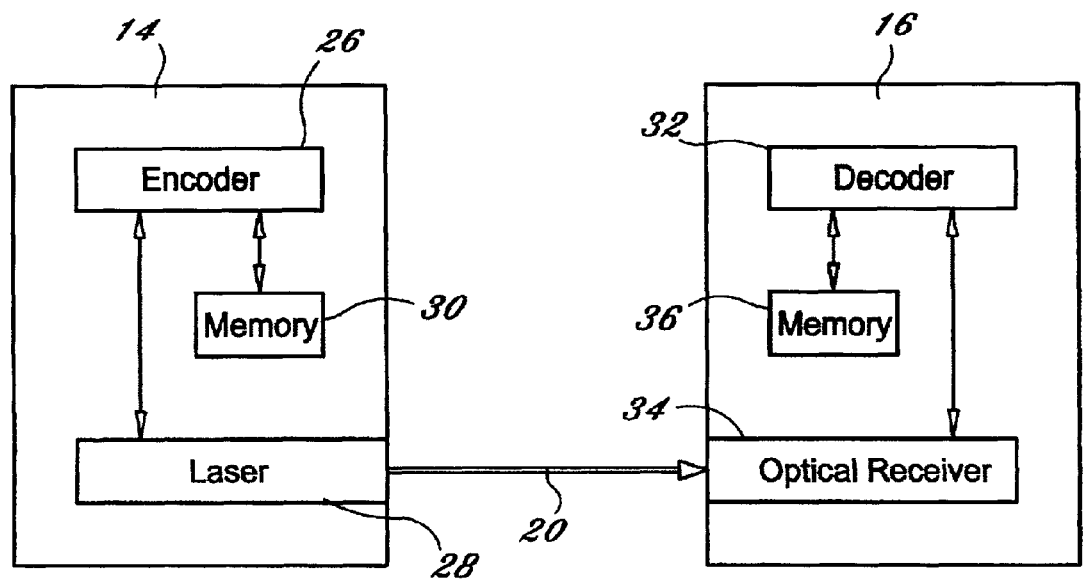
FIG. 2 is a block diagram of a single transmit and receive link constructed in accordance with the principles of the present invention.

FIG. 2 is a block diagram of a single transmit and receive link constructed in accordance with the principles of the present invention. As shown in FIG. 2, a transmitter 14 is engaged in optical communication with a receiving unit 16 via an optical link 20. As shown in FIG. 2, transmitter 14 preferably includes an encoder 26 coupled to laser 28. Encoder 26 is also electrically-coupled to transmit memory 30. In operation, encoder 26 is controlled by CPU 18 to retrieve from memory 30, a code corresponding to one or more of an active time during which to energize laser 28 and an inactive time during which laser 28 should not be energized during ALS operation. Encoder 26 instructs laser 28 to activate and deactivate the optical signal during ALS operation based on the retrieved code.

Laser 28 can be any light-generating device suitable for generating an optical signal for transmission along optical link 20. Memory 30 can be any memory 30 suitable for storing codes and corresponding characteristic data such as a random access memory ("RAM"), EEPROM, NVRAM, ROM, flash memory, and the like.

Receiving unit 16 includes decoder 32 electrically coupled to optical receiver 34 and receiver memory 36. Receiver memory 36 stores the complimentary code data as is stored in memory 30 and can be any of the memory types described above with respect to memory 30. Further, a memory 30 and memory 36 in a given node 12 can be part of the same general memory structure and need not be separate physical memory structures.

In operation, decoder 32 monitors optical receiver 34 and detects active time durations of the optical signal and/or inactive times between active times of the optical signal, especially during ALS operation. Decoder 32 compares the active and/or inactive time of the ALS signal with the codes stored in memory 36 to determine the characteristic of the optical system based on the active time and/or inactive time codes. The characteristics are provided to an operator using a display device coupled to a node 12 or transmitted to a remote display device. It is contemplated that decoder 32 is controlled by CPU 18. It is also contemplated, however, that one or both of encoder 26 and decoder 32 can include an integrated CPU.

Figures 3, 4:
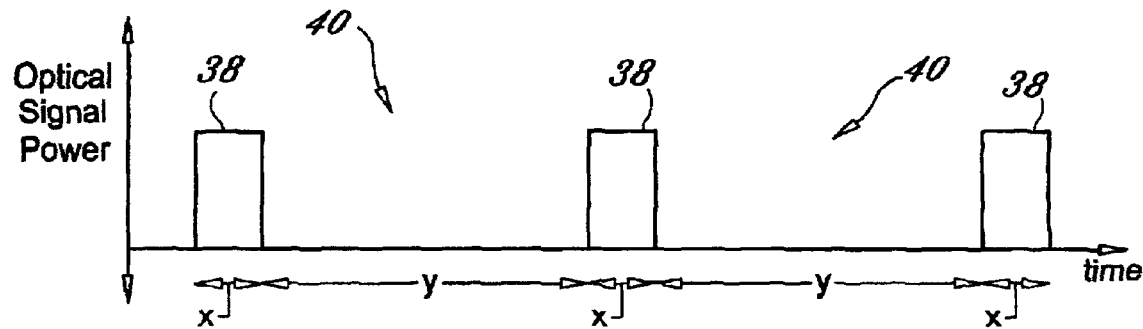
FIG. 3 is a graphical depiction of an exemplary optical pulse transmitted during ALS operation.
FIG. 4 is an exemplary table of inactive time period codes and their corresponding characteristics.

The operation of system 10 is described with reference to FIGS. 3 and 4 in which FIG. 3 depicts an optical pulse as may be transmitted by transmitter 14 during ALS operation and FIG. 4 is a table of inactive time period codes and their corresponding characteristics. Of note, the table shown in FIG. 4 is a representative example using the inactive time as the code basis, i.e. ALS laser off-time duration. However, it is contemplated that the ALS active laser signal period can serve as the basis of the code identification alone or in combination with codes based on ALS inactive periods.

As discussed above, during ALS operation, laser 28 is pulsed such that the laser is activated for a period of time and deactivated for a period of time. In accordance with standards such as the ITU-G.664 Automatic Laser Shutdown Standard, the active period of laser operation is 2 seconds±0.25 seconds and the inactive period between the active pulses is 100–300 seconds. Of course, the present invention is not limited to an embodiment related to the ITU-G.664 Standard. This standard is used merely for illustration purposes.

In accordance with the present invention, by activating the laser for a period of time corresponding to a particular code, the active time is measured by decoder 32 to form the basis of the code corresponding to the system characteristics. Similarly, the code can be embedded in the inactive period of the ALS operation such that the decoder measures the inactive time as the basis for determining the code and the resultant corresponding characteristics. It is also contemplated that a combination of the active period and inactive period can be used to encode the system characteristics.

As shown in FIG. 3, the ALS signal is comprised of active period pulses 38 and inactive periods 40. The duration of the active period pulses is defined by "x" and the inactive periods defined by time "y".

As shown in FIG. 4, the ALS off duration (inactive period) is shown corresponding to three system characteristics, namely the source identifier ("ID"), wavelength and transmit power. Source ID is an identification of the source transmitter. Because each node 12 can have multiple transmitters, the source ID is a unique identifier corresponding to a particular transmitter 14. In the example shown in FIG. 4, there are four different source identifiers. Wavelength, shown as $\lambda_n$ in which "n" represents an integer, corresponds to the wavelength transmitted by the transmitter corresponding to the associated source identifier. As shown in FIG. 4, encoder 26 will provide an inactive ALS off-time duration y of 100 seconds to transmit to receiving unit 16 characteristics including source identifier=1, wavelength=$\lambda_1$ and transmit power=$p_1$. The characteristic data is retrieved from memory 30 by encoder 26. On the receive side, decoder 32 detects an ALS off duration of 100 seconds and, upon looking in memory 36, finds that the characteristic data corresponding to a 100 second inactive period is source ID=1, wavelength=$\lambda_1$ and transmit power=$p_1$.

In this regard, the granularity of information which can be encoded and decoded is bounded by the capabilities of encoder 26 to instruct the activation of laser 28 and the ability of decoder 32 to accurately measure the duration of the active laser and/or inactive ALS periods. For example, assuming that encoder 26 and decoder 32 can operate with a 100 microsecond resolution, there are 5,000 different active pulse times distinguishable using the ITU-G.664 Standard and approximately 2,000,000 distinguishable states using the ITU-G.664 Standard if the inactive off time is used as the basis for encoding. Because the active time under ITU-G.664 ALS operation is 2 seconds±0.25 seconds, there is ½ second of acceptable active period. Assuming 100 microsecond resolution, this leaves 5,000 active pulse times. Similarly, because the ITU-G.664 ALS Standard provides for a 100–300 second off time, there is 200 seconds which can be used as the basis for encoding. With a 100 microsecond resolution, 2,000,000 distinguishable states are available. Of course, the number of states can be increased by providing encoders and decoders with resolution of better than 100 microseconds.

Also, because a typical fiber optic link may include multiplexors and/or amplifiers, these devices also receive the ALS signal during ALS operation. As long as these devices are arranged to implement the above-described features of the present invention, the present invention advantageously allows such devices which are up-stream of a fiber optic cable break to have the benefit of being able to identify the code and the corresponding characteristic information.

Although the present invention describes transmitting encoding characteristic data solely during the ALS procedure, it is contemplated that the above-described invention can be integrated with known AM frequency identification schemes to provide redundancy such that characteristic information can be transmitted normally during normal laser operation via the AM method and can also be transmitted during ALS operation. It has been advantageously found that integration with known AM frequency identification schemes can aid frequency identification in a DWDM system. In particular, integration with an AM scheme is preferred in DWDM implementations, because in a fiber optic cable carrying a DWDM signal, multiple source pulsing is not easily distinguishable unless the frequency of each pulse is separable. A result is that the present invention advantageously provides a way to distinguish source identifiers during system installation when the system installation procedure is prone to mis-fibering such that the mis-fibering would normally cause the transmitted to enter ALS operation. In prior art systems, ALS operation renders virtually impossible the ability to determine the cause for the mis-fibering and correct it, while the present invention allows an operator to determine the source identifier to quickly identify and correct the mis-fibering. Further, the present invention allows an installer to be provided the safety benefits of ALS operation while still providing a facility for identifying system characteristics such as source identification.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A system for identifying one or more characteristics of an optical signal, the system comprising:
    a transmitter, the transmitter being operable to transmit an optical signal, the transmitter comprising:
        a laser for generating the optical signal;
        an encoding unit, the encoding unit adapted to control the laser to activate and deactivate the optical signal during a laser shutdown state based on a predetermined code;
    a receiving unit including:
        an optical receiver optically coupled to the transmitter by a light transmission medium, the optical receiver being operable to receive the optical signal from the transmitter; and
        a decoder, the decoder measuring at least one of an active time of the optical signal and an inactive time between active times of the optical signal, the decoder determining at least one of the one or more characteristics of the optical system based on at least one of the active time or the inactive time.

2. The system according to claim 1, wherein the transmitter further includes a first memory in electrical communication with the encoder, the first memory storing the predetermined code corresponding to one or more characteristics of the transmitted optical signal.

3. The system according to claim 1, wherein the receiver further includes a second memory in electrical communication with the decoder, the second memory storing the predetermined code corresponding to the one or more characteristics.

4. The system according to claim 3, wherein the transmitter further includes a first memory in electrical communication with the encoder, the first memory storing the predetermined code corresponding to one or more characteristics of the transmitted optical signal.

5. The system according to claim 4, further including a code distribution unit in data communication with at least one of the transmitter and receiver, the code distribution unit storing the code and providing the code to at least one of the first memory and the second memory.

6. The system according to claim 5, wherein the data communication is out-of-band from the optical signal.

7. The system according to claim 5, wherein the data communication occurs within the optical transmission medium.

8. The system according to claim 1, wherein the active time is between approximately 1.75 seconds and approximately 2.25 seconds.

9. The system according to claim 1, wherein the inactive time between the active times is between approximately 100 seconds and approximately 300 seconds.

10. The system according to claim 1, wherein the one or more characteristics include a source identifier.

11. The system according to claim 10, wherein the one or more characteristics further including a wavelength identifier.

12. The system according to claim 4, wherein at least one of the first and second memories is a non-volatile memory.

13. The system according to claim 1, wherein the optical signal includes an amplitude modulated frequency identification signal.

14. An optical signal transmitter for use in a system to identify one or more characteristics of the optical signal, the transmitter comprising:
    a laser for generating the optical signal; and
    an encoding unit, the encoding unit adapted to control the laser to activate and deactivate the optical signal during a laser shutdown state based on a predetermined code corresponding to one or more characteristics of a transmitted optical signal.

15. The optical transmitter according to claim 14, further including a memory in electrical communication with the encoder, the memory storing the predetermined code corresponding to one or more characteristics of the transmitted optical signal.

16. The optical transmitter according to claim 15, further including a network interface in electrical communication with the memory, the network interface adapted to receive the predetermined code, wherein the memory is updated to store the received predetermined code.

17. The optical transmitter according to claim 14, wherein the active time is between approximately 1.75 seconds and approximately 2.25 seconds.

18. The optical transmitter according to claim 14, wherein the inactive time between the active times is between approximately 100 seconds and approximately 300 seconds.

19. The optical transmitter according to claim 14, wherein the one or more characteristics include a source identifier.

20. The optical transmitter according to claim 14, wherein the optical signal includes an amplitude modulated frequency identification signal.

21. A receiving unit for use in a system to identify one or more characteristics of an optical signal, the receiving unit including:
    an optical receiver adapted to receive an optical signal from a light transmission medium; and
    a decoder, the decoder measuring at least one of an active time of the received optical signal and an inactive time between active times of the received optical signal, the decoder determining at least one of the one or more characteristics of the optical system based on at least one of the active time or the inactive time.

22. The receiving unit according to claim 21, further including a memory in electrical communication with the decoder, the memory storing the predetermined code corresponding to the one or more characteristics.

23. The receiving unit according to claim 22, further including a network interface in electrical communication with the memory, the network interface adapted to receive the predetermined code, wherein the memory is updated to store the received predetermined code.

24. The receiving unit according to claim 21, wherein the active time is between approximately 1.75 seconds and approximately 2.25 seconds.

25. The receiving unit according to claim 21, wherein the inactive time between the active times is between approximately 100 seconds and approximately 300 seconds.

26. The receiving unit according to claim 21, wherein the one or more characteristics include a source identifier.

27. The receiving unit according to claim 21, wherein the optical signal includes an amplitude modulated frequency identification signal.

28. A method for identifying one or more characteristics of an optical signal, the method comprising:

reading from a memory, a predetermined code corresponding to at least one characteristic of the optical signal;

controlling a laser to activate and deactivate the optical signal during a laser shutdown state based on the predetermined code;

receiving the optical signal at a receiving unit;

measuring at least one of an active time of the optical signal and an inactive time between active times of the optical signal; and determining at least one of the one or more characteristics of the optical system based on at least one of the active time or the inactive time.

29. The method according to claim 28, further comprising storing the predetermined code in a memory.

30. The method according to claim 28, further comprising receiving the predetermined code from a code distribution device.

31. The method according to claim 28, wherein the one or more characteristics include a source identifier.

32. The method according to claim 28, wherein the optical signal includes an amplitude modulated frequency identification signal.

* * * * *